United States Patent [19]

Sismour, Jr. et al.

[11] Patent Number: 4,922,147

[45] Date of Patent: May 1, 1990

[54] APPARATUS AND METHOD FOR THERMAL BALANCING OF THE ROTOR OF A DYNAMO-ELECTRIC MACHINE

[75] Inventors: Albert C. Sismour, Jr., Casselberry; Robert T. Hagaman, Oviedo; Sui-Chun Ying, Winter Springs, all of Fla.

[73] Assignee: Westinghouse Electric Corp., Pittsburgh, Pa.

[21] Appl. No.: 275,852

[22] Filed: Nov. 25, 1988

[51] Int. Cl.⁵ .............................................. H02K 1/32
[52] U.S. Cl. ......................................... 310/61; 310/53
[58] Field of Search ....................... 310/51, 61, 64, 65, 310/214, 215, 53, 54, 57, 58, 59

[56] References Cited

U.S. PATENT DOCUMENTS 3,163,789  12/1964  Rosenberg ............................ 310/53

FOREIGN PATENT DOCUMENTS 0131704  10/1979  Japan ................................. 310/61
0056435   4/1980  Japan ................................. 310/61

Primary Examiner—Patrick R. Salce
Assistant Examiner—Judson H. Jones
Attorney, Agent, or Firm—M. G. Panian

[57] ABSTRACT

An apparatus and method are provided for thermally balancing the rotor of a dynamo-electric machine by adjusting the flow of coolant through the rotor. According to one embodiment of the invention, the cooling flow is adjusted by inserted baffles into the axial coolant flow passages in the body portion of the rotor. According to another embodiment of the invention the cooling flow is adjusted by inserting adjustable orifices into the radial cooling passages in the body portion of the rotor.

16 Claims, 8 Drawing Sheets

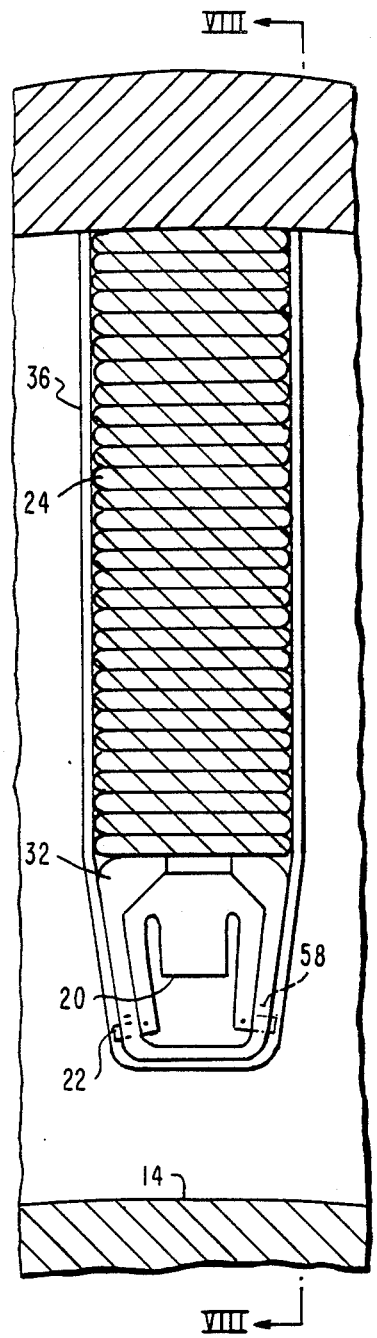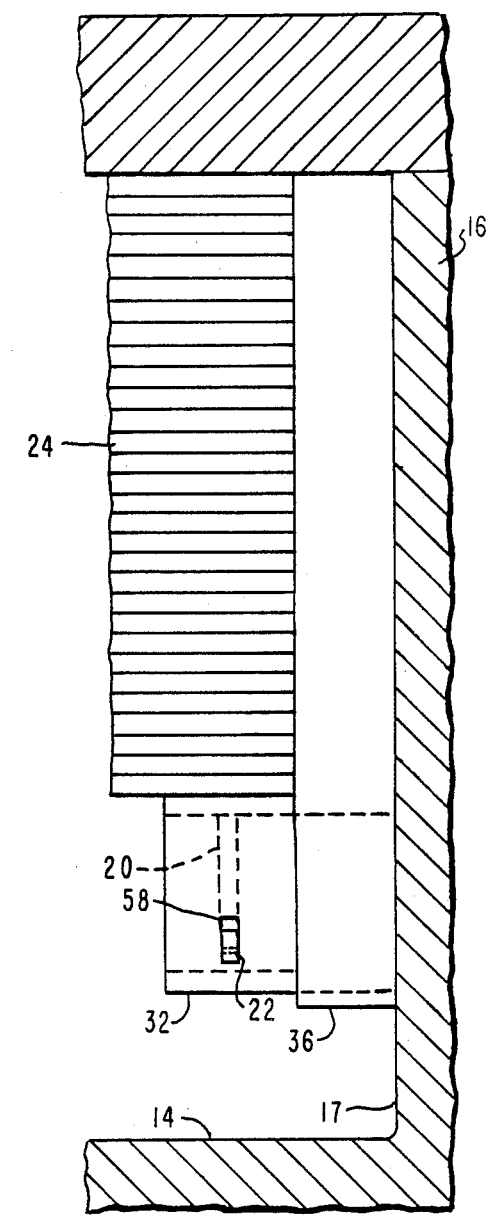
FIG. 7
FIG. 8

APPARATUS AND METHOD FOR THERMAL BALANCING OF THE ROTOR OF A DYNAMO-ELECTRIC MACHINE

STATEMENT OF GOVERNMENT INTEREST

The invention herein described was made in the course of or under a contract, or subcontract thereunder, with the Department of the Navy.

BACKGROUND OF THE INVENTION

1. Field of the Invention

The present invention generally relates to dynamo-electric machines, and more specifically, to dynamo-electric machines with radially ventilated rotors.

Vibration of the rotor in a dynamo-electric machine subjects the machine, as well as nearby equipment, to potentially harmful cyclic stress. In addition, rotor vibration is a chief cause of undesirable structure-borne noise in naval vessels. Vibration of the rotor can result from a variety of circumstances, the primary circumstance being that the mass centerline of the rotor does not exactly coincide with the centerline through the bearings which support the rotor, a situation referred to as unbalance. Hence, elimination of rotor unbalance, referred to as balancing, is of primary concern in the design, manufacture and operation of dynamo-electric machines and considerable effort has been devoted in the past toward developing means for balancing such rotors. The present invention discloses an apparatus and method for thermal balancing of such rotors.

1. Description of the Prior Art

Unbalance is minimized by careful manufacture of the rotor, attempting to make it as straight and symmetrical as possible so that the mass centerline of the rotor will coincide with the bearing centerline as closely as possible. After manufacturing, the effects of any residual unbalance can be compensated for in a shop balancing procedure. In this procedure the rotor is spun in a balance machine prior to its installation into the stator. The balance machine measures the amplitude and phase angle of the rotor vibration, from which the amount and location of weight to be added to the rotor to compensate for any unbalance can be determined.

After installation and initial operation of the dynamo-electric machine, it is often necessary to perform further balancing in the field in order to compensate for the effects of installation on the rotor vibration, as well as any unbalance due to a slight settling in of the rotor components. In the field balancing procedure, special instrumentation is utilized to measure the amplitude and phase angle of the rotor vibration. After this baseline measurement, a trial weight of predetermined amount is added to the rotor at a location which experience has indicated will yield a beneficial effect on the vibration measured. The amplitude and phase angle of the vibration are measured again. The effect of the trial weight on the vibration is calculated and, by extrapolating this effect, the amount and location of the balance weight necessary to minimize the vibration is determined. Often several attempts at adding weight are necessary in order to determine the optimum amount and location of balance weight required.

Since the unbalance compensated for as described above is due to permanent conditions in the rotor, it is expected that having completed the shop and field balancing procedures, the rotor vibration should remain low for a considerable time, until erosion, wear or damage upsets the balance. Unfortunately, as explained below, operation of the dynamo-electric machine can result in unbalance of the rotor due to transient conditions, referred to as thermal unbalance, which cannot be compensated for by adding weight as is done for unbalance due to permanent conditions in the rotor.

The rotor of a dynamo-electric machine contains a plurality of conductors which form the field windings and which are disposed in axially-oriented slots spaced about the periphery of the rotor. In operation, considerable heat is generated in these field winding conductors, the amount of heat generated being dependent on the electrical output of the machine. Consequently, it is necessary to cool the conductors. One common form of cooling, referred to as radial ventilation, employs a cooling fluid flowing radially through the conductors.

In U.S. Pat. No. 4,508,985, which is assigned to the assignee of the present invention, and is incorporated herein by reference, the general characteristics of machines with radially ventilated rotors are described as they have been made heretofore.

In machines with such radial ventilation of the rotor in accordance with the prior art, the coolant is supplied to the portion of the rotor containing the end turns of the field winding conductors through a stationary inlet duct that extends substantially radially from the periphery of the housing enclosing the machine. The coolant flows radially inward from the inlet duct, entering the rotor through an annular chamber between the rotor shaft and the end turns. Part of the coolant flows outward and exits the rotor. The remaining coolant flows into axial passageways formed by channels disposed in the slots containing the field winding conductors and then radially outward through a plurality of radial passageways in the field winding conductors, thereby cooling them. The coolant then exits through radial holes in the wedges which retain the field winding conductors in the slots and enters the gap between the rotor periphery and the stator. The coolant then flows axially through the gap and joins the coolant from the end turn portion of the field winding conductors. The combined coolant flow is then ducted to a cooler where heat is removed and the coolant is recirculated back through the rotor.

As a result of numerous factors, such as variations in the coolant flow, insulation properties, etc., there is a tendency for non-uniformities to develop in the temperature distribution in the rotor in both the circumferential and axial directions. These temperature non-uniformities, if asymmetrically distributed, can produce a geometric bow as a result of the differential thermal expansion in the rotor material between the hotter and cooler portions of the rotor. FIGS. 11 and 12 show a rotor 72 with an asymmetric temperature distribution such that the portion of the rotor denoted 74 is hotter than the portion denoted 76. Since portion 74 expands more than portion 76, the rotor forms a bow with the hotter portion 74 being on the convex side of the bow. As a result of the bow, the mass centerline 68 of the rotor is displaced from the centerline 66 of the bearings 64 by an amount 70, thus causing an unbalance in the rotor and hence vibration.

One approach to the thermal unbalance problem known in the prior art is the use of balance weights, as previously explained for the case of unbalance due to permanent conditions, attached to the rotor in appropriate locations to offset the effect of the bow. However, since the thermal balance is due to transient conditions and varies with operating parameters such as electrical output and cooling fluid temperature, it is impossible to obtain the optimum balance for all operating conditions. Typically the amount of balance weight added is insufficient to adequately offset the bow when the electrical output is high, but results in over-compensation when the output is low. Consequently, this approach results in what is often referred to as a compromise balance.

Other approaches to the thermal unbalance problem deal with the temperature non-uniformity directly and seek to eliminate the bow by locally adjusting the rotor cooling. Such approaches are referred to as thermal balancing. One approach utilizes a rubber plug placed in the axial coolant passageway of the field winding conductor slot located in the coolest portion of rotor, thereby locally increasing its temperature. However, since this approach is limited to either full or zero coolant flow through a slot, it does not allow fine-tuning of the temperature pattern and may create temperature distortion more severe than initially had. A second approach involves locally reducing the flow area of the annular chamber between the shaft and the end turns. However, this approach allows for only a gross effect over a large sector of the rotor circumference. Abovementioned U.S. Pat. No. 4,508,985 describes a third approach which involves attaching a plate to an inlet fairing on the rotor end face. The plate blocks a portion of the axial coolant passageway of a field winding conductor slot. However, this approach requires affixing inlet fairings to the rotor end face and is subject to unintended variations in the blocked portion of the coolant passageway due to sliding of the plates. Furthermore, since each of these methods adjusts the coolant flow into the axial passageways extending the length of the rotor, they are only capable of making adjustments which effect the circumferential temperature distribution over the entire length of the rotor equally, whereas the non-uniformity may occur over only a portion of the rotor's length. Hence, compensating for a non-uniform temperature distribution at one axial location using these methods may result in causing a new non-uniformity at another axial location.

Therefore, it is desirable to provide an apparatus and method for the thermal balancing of radially ventilated rotors in dynamo-electric machines which allow for adjustments in the cooling flow which, although substantial, can be finely tailored to the thermal unbalance and permit correction of circumferential and axial non-uniformities in the temperature distribution.

SUMMARY OF THE INVENTION

Accordingly, it is the general object of the present invention to provide a method and apparatus for thermal balancing of radially ventilated rotors in dynamo-electric machines.

More specifically, it is an object of the present invention to achieve such balancing by finely adjusting the flow of coolant through localized portions of the rotor, thereby adjusting the temperature distribution throughout the rotor.

Briefly, these and other objects of the present invention are accomplished in a dynamo-electric machine having a rotor with axially extending slots in its body portion. These slots contain field winding conductors and an axial passageway through which coolant flows. Radially-oriented passageways, disposed at intervals along each slot, allow the coolant in the axial passageways to flow radially out of the rotor, exiting at its periphery.

According to one embodiment of the present invention, the flow of coolant through the axial passageway in any slot can be individually adjusted by installing a baffle at the entrance of the axial passageway to restrict the flow of coolant through the passageway. By varying the size of a tab-like projection in the baffle, the flow of coolant can be finely adjusted. The baffle features a spring means which retains the baffle within a slot formed in a channel encasing a portion of the axial passageway.

According to another embodiment of the invention, the flow of coolant through any radial passageways can be individually adjusted by rotation of an orifice disk placed in the radial passageway, thus allowing adjustment of both the circumferential and axial temperature distribution in the rotor.

BRIEF DESCRIPTION OF THE DRAWINGS

FIG. 7 is a cross-section taken through line VII—VII of FIG. 3 showing a rotor body slot and its contents in the vicinity of one of the rotor body end faces and showing the installation of a baffle according to the present invention.

FIG. 8 is a cross-section taken through line VIII—VIII of FIG. 7.

DESCRIPTION OF THE PREFERRED EMBODIMENTS

Figure 1:
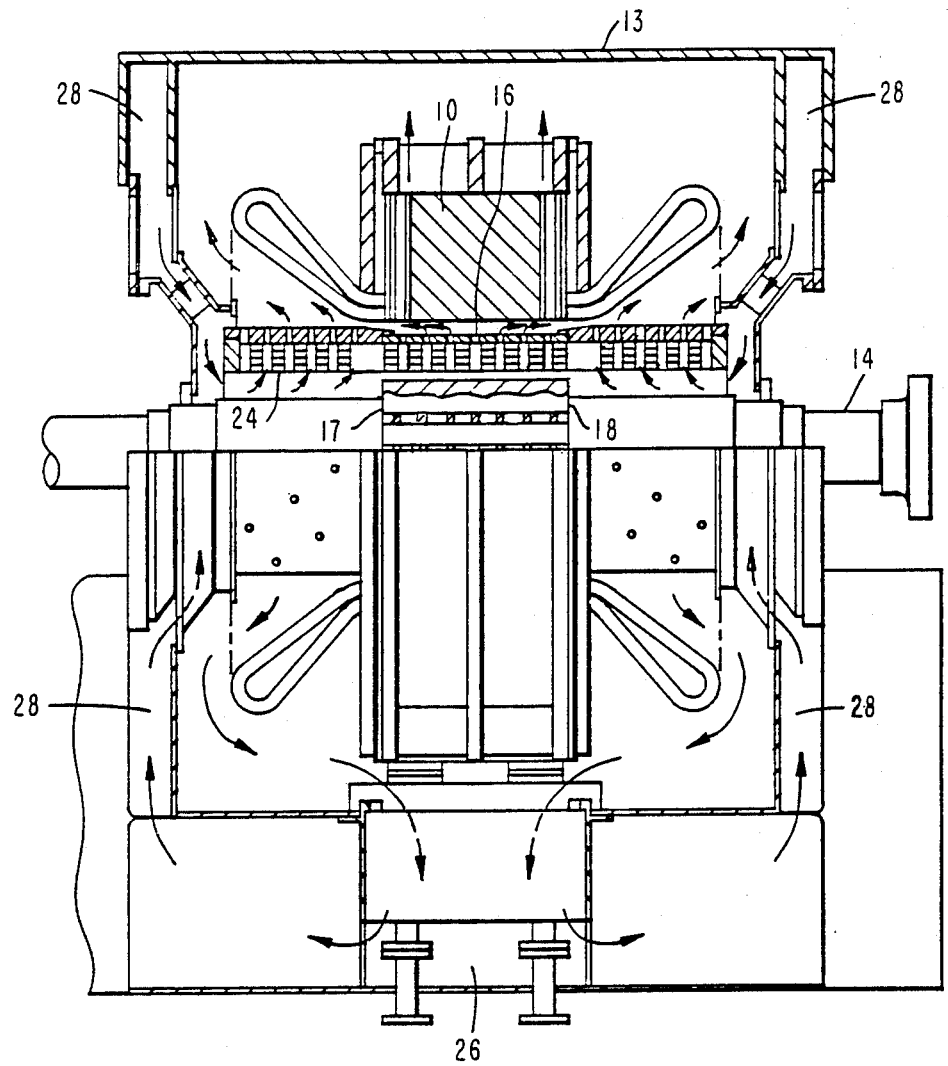
FIG. 1 is a general view, partly in cross-section, of a dynamo-electric machine.

Referring to the drawings, wherein like numerals represent like elements, there is illustrated in FIG. 1 a dynamo-electric machine, such as a large or medium turbine generator. The generator contains a stator 10 and a centrally disposed rotor. The rotor is composed of a shaft 14 and a body portion 16 having axially opposed end faces 17 and 18.

Figure 2:
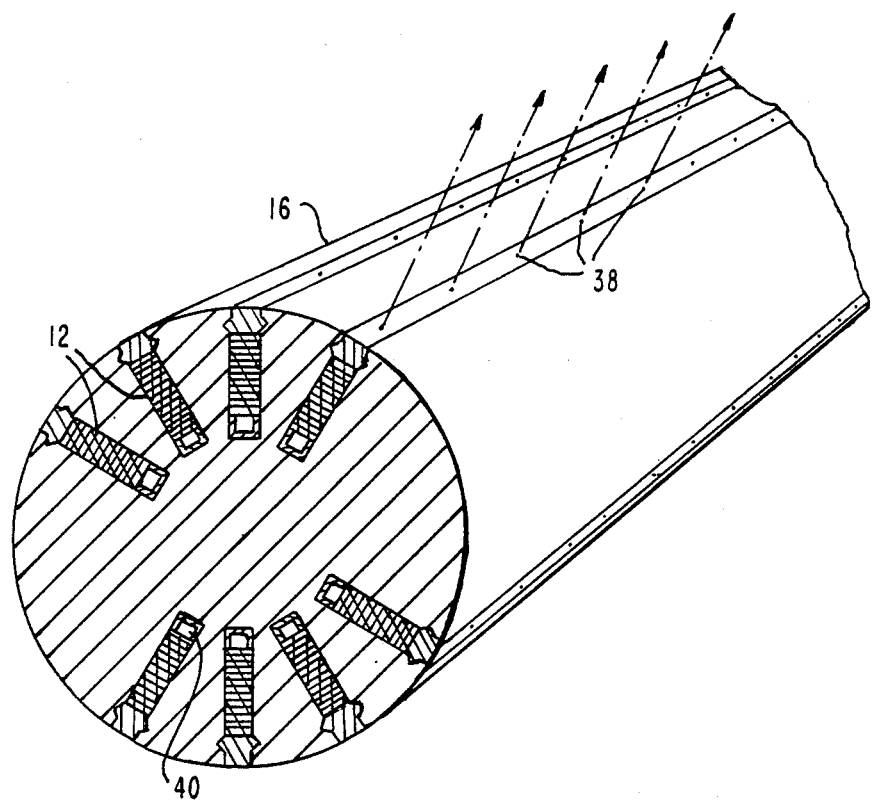
FIG. 2 is a perspective view of the body portion of the rotor of the dynamo-electric machine shown in FIG. 1.
Figure 4:
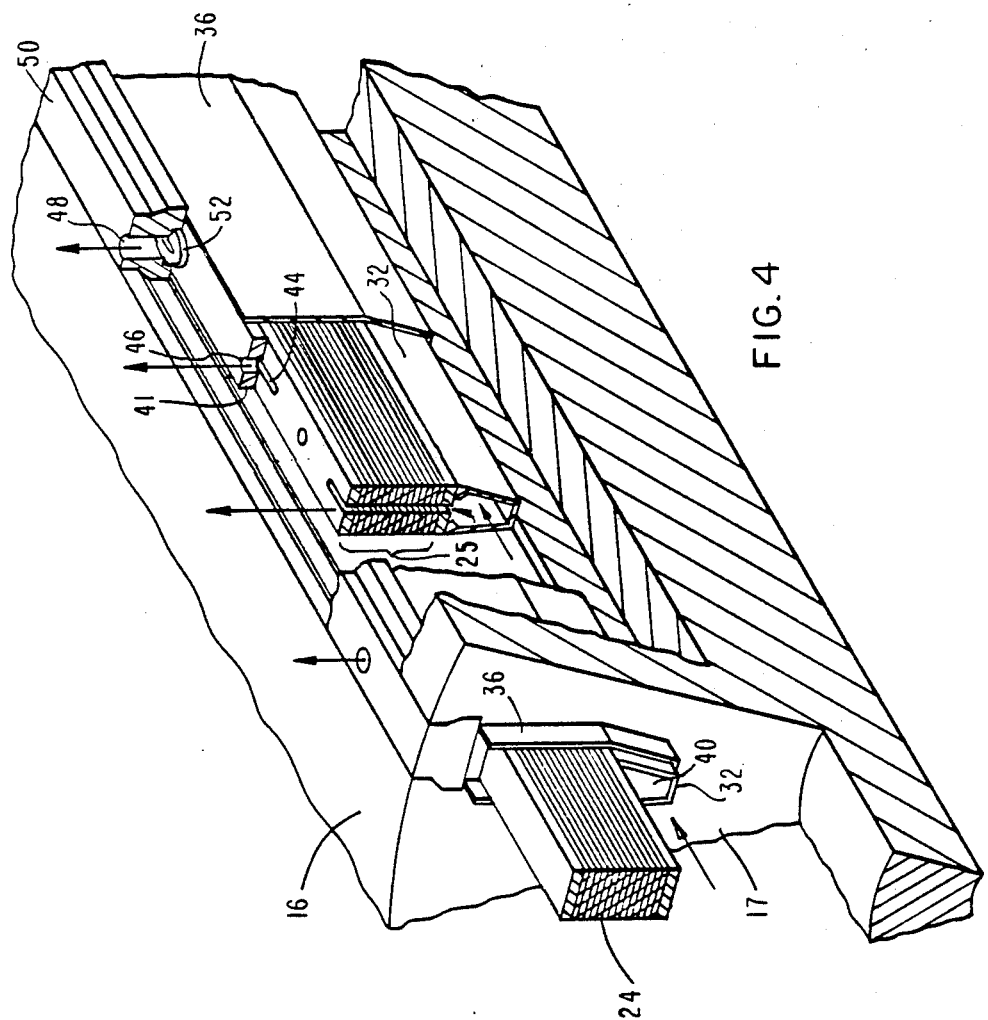
FIG. 4 is a perspective view, with broken-away elements, of the body portion of the rotor in the vicinity of one of its end faces, showing the installation of an orifice disk according to the present invention.
Figure 5:
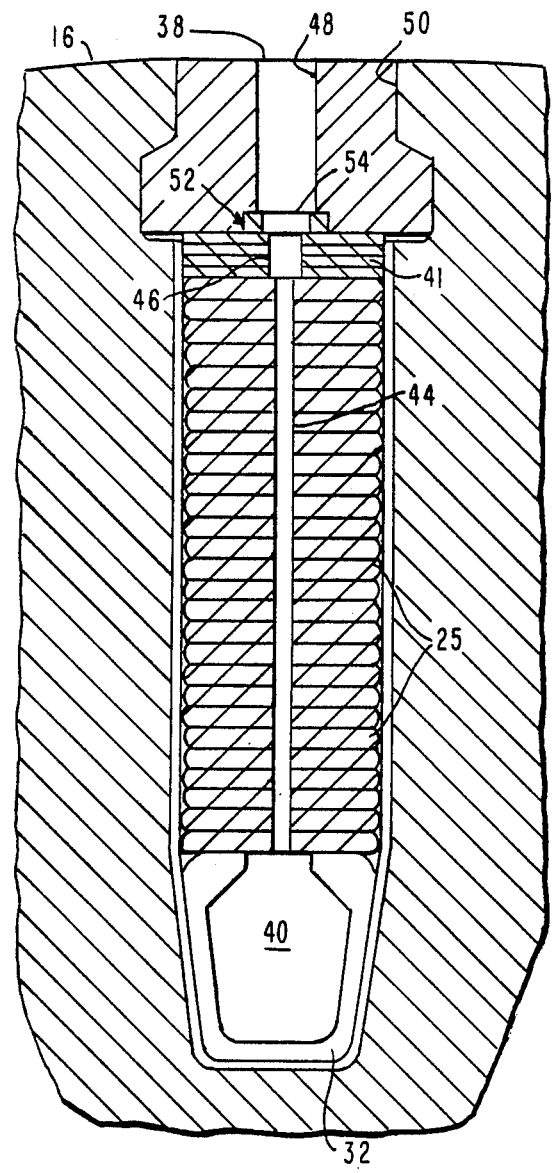
FIG. 5 is a cross-section taken through line V—V of FIG. 3 showing a rotor body slot and its contents, including an orifice disk according to the present invention.

As shown in FIG. 2, there are a plurality of axially oriented slots spaced around the periphery of the body portion 16 of the rotor. The slots 12 carry field winding conductors, as shown in FIGS. 4 and 5. A portion of each slot forms an axially extending passageway 40 which is partially encased in a channel 32 disposed at the bottom of the slot. A wedge 50 retains the slot contents and an insulating filler 41 is disposed between the conductors 25 and the wedge. An insulating cell 36 lines the inside of the slot, encasing the channel 32, conductors 25 and insulating filler 41. As shown in FIGS. 4 and 8, the insulating cell 36 extends beyond the end face of the rotor to ensure that deposits do not form a conducting path between the shaft 14 and the conductors 25 where the conductors exit the body portion 16 of the rotor at its end face 17. The channel 32, which provides support for the insulating cell 36, extends slightly beyond the cell.

Figure 3:
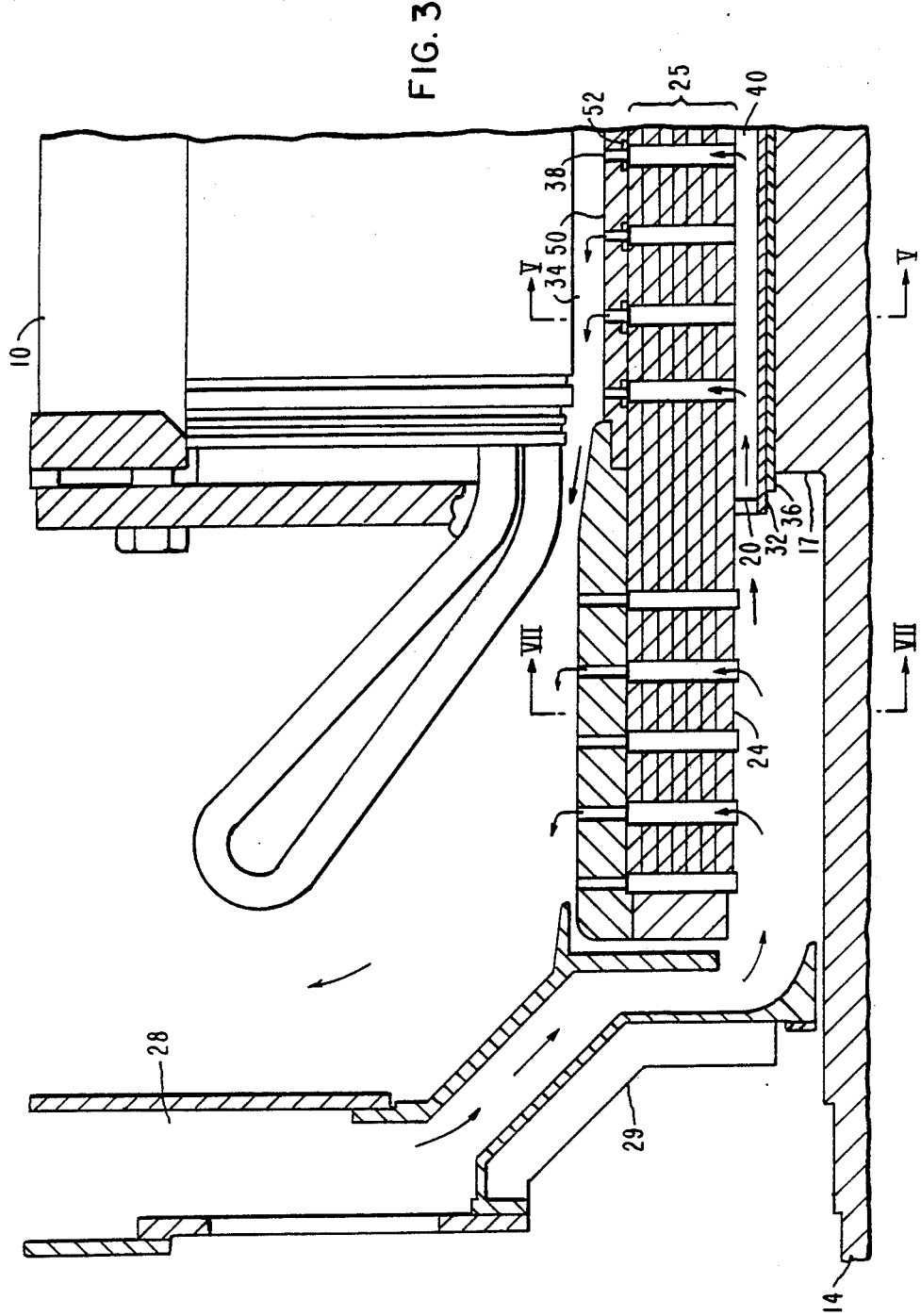
FIG. 3 is a longitudinal cross-section through the end turn region of the dynamo-electric machine shown in FIG. 1, showing the incorporation of two embodiments of the present invention.

As shown in FIG. 1, the stator and rotor are encased in a housing 13 through which a coolant gas, such as air or hydrogen, circulates. A blower, not shown, may be used to assist in the circulation of the coolant. Coolant, after recirculation through a cooler 26, flows through inlet ducts 28 formed in the housing 13. As shown in FIG. 3, after exiting the inlet duct 28, the coolant flows through the annular chambers formed at each end of the rotor by the end turn portions 24 of the field winding conductors 25 and the shaft 14 and enters the body portion 16 of the rotor at end faces 17 and 18. In the body portion of the rotor, the coolant flows through the axial passageways 40 formed in the slots 12 shown in FIG. 2.

As shown in FIGS. 2 and 3, a plurality of radial passageways 38 spaced along each slot, allow the coolant flowing in the axial passageways 40 to flow radially outward and exit the body portion of the rotor at its periphery. After exiting the rotor the coolant flows through the gap 34 between the rotor and stator, as shown in FIG. 3. After exiting the gap 34 the coolant enters a cooler 26, as shown in FIG. 1, before recirculating back to the inlet duct 28. As shown in FIGS. 4 and 5, each radial passageway 38 in the slots 12 is comprised of a series of radially aligned slots 44 formed in the field winding conductors 25, a slot 46 in the insulating filler 41 and a hole 48 in the wedge 50.

Figure 9:
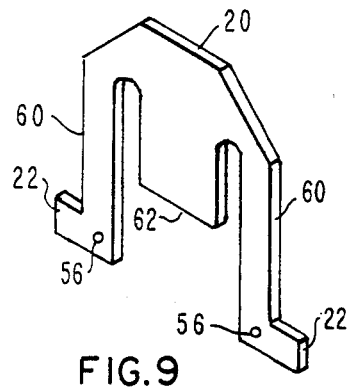
FIG. 9 is a perspective view of the baffle according to the present invention.

According to one embodiment of the invention, thermal balancing is effected by installing a baffle 20, shown in FIG. 9, into the axial passageway 40 of one or more of the rotor body slots 12. The baffle may be installed into the entrance of the axial passageway at either or both ends of the rotor. The baffles may be retained in the portions of the channels 32 which extend beyond the insulating cells 36, as shown in FIGS. 7 and 8. The amount of coolant flowing axially through each slot and hence the circumferential temperature distribution in the rotor, can be finely and individually adjusted by varying the size of the tab 62 formed in the baffle 20, and thus the portion of the channel flow area restricted by the baffle. The baffle 20 is installed by deforming its legs 60 toward the tab 62 using a tool which engages conveniently located holes 56 in each leg. The baffle may then be placed into the entrance of the channel 32 and the legs 60 released. In its free, undeformed state, the width of the baffle across its legs is greater than the width of the inside of the channel so that the baffle is retained in the channel by means of a spring force exerted by the legs of the baffle against the interior walls of the channel, as shown in FIG. 7. It is not necessary to remove the rotor to install the baffles, although a portion of the inlet duct wall and an end bracket 29, shown in FIG. 3, must be removed to gain access to the channel entrances. Retention of the baffle is further aided by projections 22 emanating from the ends of the baffle legs 60, as shown in FIG. 9. As shown in FIG. 7 and 8 these projections can be inserted into slots 58 formed in opposing walls of the channel 32.

Figure 10:
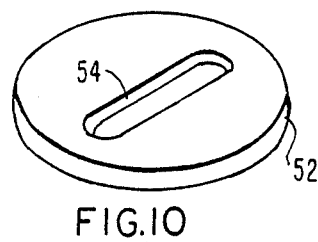
FIG. 10 is a perspective view of the orifice disk according to the present invention.

According to another embodiment of the invention, thermal balancing is effected by inserting an orifice created by a slot 54 formed in a disk 52, as shown in FIG. 10, into each radial passageway 38 in the rotor body slots 12, as shown in FIG. 3, 4 and 5. Each disk 52 is disposed between the wedge 50 and insulating filler 41. As shown in FIG. 5, a counter bore in the hole 48 through the wedge serves to retain the disk. The slot 54 in the disk 52 is aligned with the slots 44 in the field winding conductors 25, the slot 46 and the insulating filler 41 and the hole 48 in the wedge 50.

Figure 6A:
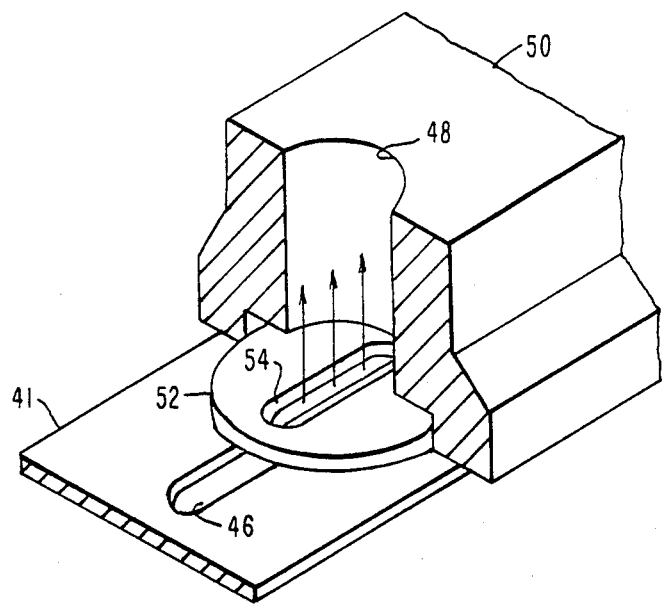
FIGS. 6A and 6B are perspective views of the slot wedge, orifice disk and insulating filler shown in FIGS. 4 and 5, showing the orifice disk in its maximum and minimum flow orientations, respectively.
Figure 6B:
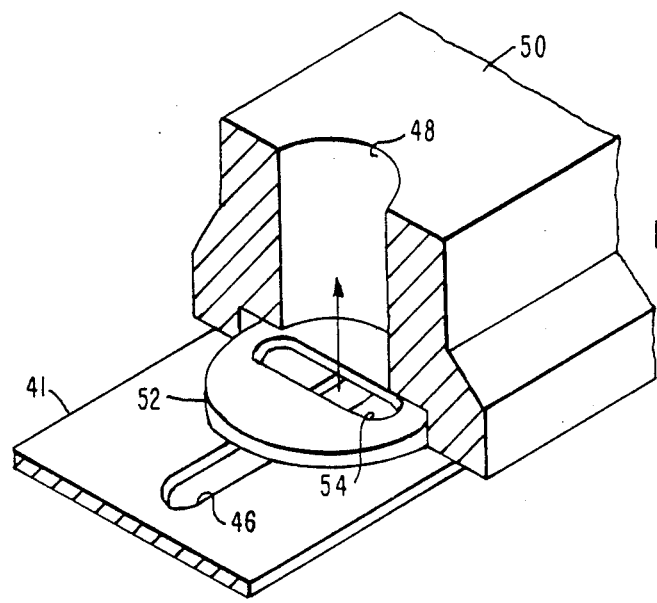

The length of the slot 54 in the disk 52 is equal to the diameter of the hole 48 in the wedge 50. The width of the slot 54 in the disk 52 is equal to the width of the slot 46 in the insulating filler 41. Thus, when the major axis of the slot 54 is aligned with the major axis of the slot 46 in the insulating filler 41, as shown in FIG. 6A, the effective flow area of the radial passageway 38 remains that of the common area of the slot 46 in the insulating filler and the hole 48 in the wedge, hence the flow area is not effected by the presence of the orifice, and the coolant flow through the radial passageway is at its maximum. As the disk is rotated, the flow area of the radial passageway, and hence the flow of coolant through it, is reduced as a result of the presence of the orifice. When the disk is rotated so that the major axis of its slot 54 is aligned with the minor axis of slot 46, as shown in FIG. 6B, the flow area becomes that of the common area in the slot 46 in the insulating filler and the slot 54 in the disk. With the disk in this orientation the flow area of the radial passageway, and hence the flow of coolant through it, is at its minimum. Thus, the coolant flow through each radial passageway can be finely adjusted to any value between these minimum and maximum flow rates. Further, since the radial passageways are spaced throughout the rotor in both the axial and circumferential directions, both axial and circumferential temperature non-uniformities can be eliminated.

The diameter of the counterbore in the hole 48 in which the disk 52 is retained is slightly smaller than the diameter of the disk. At installation, the disk is cooled, for example by immersing it in liquid nitrogen, to allow insertion into the counterbore. After the disk warms up to the temperature of the wedge, the resulting shrink fit prevents inadvertent rotation of the disk. Rotation of the disk to adjust the coolant flow requires removal of the rotor from the stator and recooling of the disk. Rotation of the disk can be facilitated by a tool, such as a screw driver, inserted into the slot 54 through the hole 48 in the wedge.

In practice the method of thermally balancing the rotor may involve measuring the temperature of the rotor body portion at various circumferential and axial locations and adjusting the flow of coolant, as previously described, accordingly.

Figure 11:
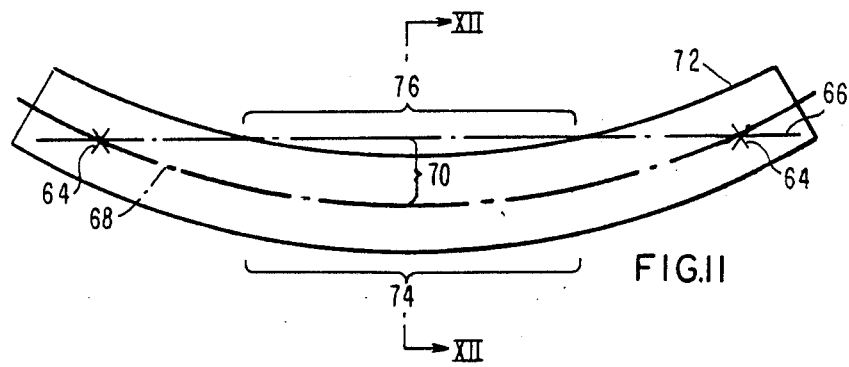
FIG. 11 is a diagram of a rotor having a bow.
Figure 12:
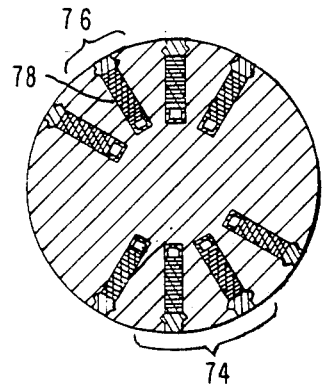
FIG. 12 is a cross-section through the rotor shown in FIG. 11 taken through line XII—XII.

Alternatively, adjustments to the coolant flow necessary to thermally balance the rotor may be based on measurements of the rotor vibration. Referring to FIG. 11, note that if unbalance in a rotor was caused by a permanent bow, then, using the prior art balancing methods previously discussed, it would be compensated for by adding weight to the periphery of the rotor 72 at the concave side 76 of the bow, thereby shifting the mass centerline 68 of the rotor back toward to the bearing centerline 66. Using the thermal balancing method disclosed by the present invention, if the bow in the rotor depicted in FIG. 11 were caused by an asymmetric temperature distribution such that the portion of the rotor denoted 74 is hotter than the portion denoted 76, then the bow could be eliminated by reducing the coolant flow in slot 78, located in the cooler portion 76 of the rotor, by inserting a baffle into the channel in slot 78 or rotating the disks containing the orifices in the radial passageways in the center portion of slot 78, depending on the embodiment of the invention utilized.

Since, in reality, the bow in the rotor is not visually apparent, the amount and location of the coolant flow adjustment necessary to eliminate the bow is based on measurements of the amplitude and phase angle of vibration. The method is similar to that previously discussed for the field balancing procedure, except that instead of adding a trial weight, a predetermined trial adjustment in the cooling flow is made at a location which experience indicates will have a beneficial effect on the vibration. The amount and location of coolant flow adjustment necessary to eliminate the thermal unbalance, and hence minimize the vibration, is then determined based on the effect of the trial adjustment.

Many modifications and variations of the present invention are possible in light of the above techniques. It is therefore to be understood that within the scope of the appended claims, the invention may be practiced otherwise than as specifically described.

We claim:

1. A dynamo-electric machine comprising:
   (a) a stator;
   (b) a rotor centrally disposed within said stator and having a body portion;
   (c) a housing encasing said stator and rotor;
   (d) a fluid coolant circulating within said housing and flowing through said stator and rotor;
   (e) a plurality of axially extending rotor body slots in said body portion of said rotor, each of said rotor body slots containing a plurality of field winding conductors, each of said rotor body slots containing an axial passageway and a plurality of radial passageways, said coolant flowing through said axial and said radial passageways; and
   (f) means for finely and individually regulating said coolant flow in any one of said rotor body slots, thereby enabling modification of the temperature distribution in said rotor, wherein said regulating means further comprises
      i. a baffle disposed in said axial passageway in said rotor body slot in which said coolant flow is to be regulated, thereby restricting the flow area of said axial passageway, the size of said baffle being variable depending on the amount of regulation of said coolant flow desired, and
      ii. an orifice means forming a portion of one of said radial passageways in said rotor body slot in which said coolant flow is to be regulated, the effect of said orifice means on the flow area of said radial passageway being variable.

2. A dynamo-electric machine according to claim 1 further comprising:
   (a) a channel for each of said rotor body slots, each of said channels disposed in its respective rotor body slot and enclosing a portion of said axial passageway in its respective rotor body slot, and
   (b) means for retaining said baffle within any of said channels.

3. A dynamo-electric machine according to claim 2 wherein said retaining means comprises a spring.

4. A dynamo-electric machine according to claim 3 wherein said spring comprises a leg emanating from said baffle, said leg being flexible, the size of said baffle when said leg is in its free, undeformed state being larger than the interior of said channel, whereby said leg is deformed when said baffle is disposed in one of said channels and exerts a spring force against said channel interior.

5. A dynamo-electric machine according to claim 4 wherein said retaining means further comprises:
   (a) a slot in each of said channels; and
   (b) a projection emanating from said leg of said baffle, said projection being insertable into said channel slots.

6. A dynamo-electric machine according to claim 4 further comprising a hole in said leg enabling the engagement of a tool for deforming said leg and inserting said baffles into one of said channels. regulated, the effect of said orifice means on the flow area of said radial passageway being variable.

7. A dynamo-electric machine according to claim 1 further comprising:
   (a) a wedge means disposed at the periphery of each of said rotor body slots for retaining the contents of said slots; and
   (b) an insulating filler disposed in each of said rotor body slots between said wedge means and said field winding conductors.

8. A dynamo-electric machine according to claim 7 wherein each of said radial passageways contained in said rotor body slots is comprised of a slot through each of said field winding conductors, a slot through one of said insulating fillers and a hole through one of said wedge means, whereby each of said radial passageways communicates with said axial passageway in the same said rotor body slot enabling said coolant flowing through said axial passageways to exit said rotor at its periphery.

9. A dynamo-electric machine according to claim 8 wherein said orifice means comprises a slot in a rotatable disk, said disk being disposed between said wedge means and said insulating filler, the length and width of said slot in said disk being such that the maximum coolant flow through said radial passageway occurs when said disk is rotated so that the major axis of said slot in said disk is aligned with the major axis of said slot in said insulating filler and the minimum coolant flow occurs when said disk is rotated so that the minor axis of said slot in said disk is aligned with the major axis of said slot in said insulating filler.

10. A dynamo-electric machine according to claim 9 wherein said length of said slot in said disk is equal to the diameter of said hole in said wedge means and said width of said slot in said disk is equal to the width of said slot in said insulating filter.

11. In a dynamo-electric machine of the type having:
   a stator;
   a rotor centrally disposed within said stator and having a body portion;
   a housing encasing said stator and said rotor;
   a fluid coolant circulating within said housing and flowing through said stator and said rotor;
   a plurality of axially extending slots in said body portion of said rotor, each of said slots containing a plurality of field winding conductors, each of said slots containing an axial passageway and a plurality of radial passageways, said coolant flowing through said axial and said radial passageways;

a method of thermally balancing said rotor comprising the steps of:
  (a) measuring the amplitude and phase angle of the vibration of said rotor;
  (b) providing means for adjusting said coolant flow in each of said axial and radial passageways;
  (c) adjusting said coolant flow in a selected one of said slots, utilizing said axial and radial adjusting means provided in step (b);
  (d) repeating step (a);
  (e) comparing said vibration measured in step (a) with said vibration measured in step (d) to determine the effect on said vibration of said adjustment in said cooling flow made in step (c);
  (f) calculating the magnitude and location of coolant flow adjustment necessary to minimize said vibration measured in step (a) based on the effect of said adjustment made in step (c) as determined in step (e);
  (g) reversing said adjustment in said coolant flow made in step (c);
  (h) adjusting said coolant flow by said magnitude calculated in step (f) in the one of said slots closest to said location calculated in step (f).

12. Method according to claim 11 wherein said adjusting means provided in step (b) comprises a plurality of baffles, each baffle being insertable into each of said axial passageways, thereby restricting the flow area of said passageway, each of said baffles having means for enabling the modification of the amount of said restriction in said flow area provided by said baffle.

13. Method according to claim 12 wherein said adjusting of said coolant flow in steps (c) and (h) comprise the steps of:
  (a) modifying the amount of said restriction in said flow area provided by one of said baffles depending on the magnitude of said coolant flow adjustment desired; and
  (b) inserting said one of said baffled into said axial passageway in the one of said slots selected for coolant flow adjustment.

14. Method according to claim 11 wherein said adjusting means provided in step (b) comprises an orifice means for each of said radial passageways, each of said orifice means being insertable into each of said radial passageways, each of said orifice means having means for enabling varying the effect of said orifice means on the flow area of its respective radial passageway.

15. Method according to claim 14 further comprising the step of inserting each of said orifice means into each of said radial passageways.

16. Method according to claim 15 wherein said adjustment to said cooling flow in steps (c) and (h) comprise the step of varying said effect of said orifice means on said flow area of one of said radial passageways in the one of said slots selected for coolant flow adjustment.

* * * * *